United States Patent
Wolf

(10) Patent No.: US 7,362,778 B2
(45) Date of Patent: Apr. 22, 2008

(54) PLESIOCHRONOUS DEMULTIPLEXER

(75) Inventor: Michael Joachim Wolf, Mundelsheim (DE)

(73) Assignee: Alcatel, Paris (FR)

( * ) Notice: Subject to any disclaimer, the term of this patent is extended or adjusted under 35 U.S.C. 154(b) by 1024 days.

(21) Appl. No.: 10/364,530

(22) Filed: Feb. 12, 2003

(65) Prior Publication Data

US 2003/0161350 A1 Aug. 28, 2003

(30) Foreign Application Priority Data

Feb. 28, 2002 (EP) .............................. 02360076

(51) Int. Cl.
*H04J 3/06* (2006.01)

(52) U.S. Cl. ...................... 370/503; 370/516

(58) Field of Classification Search ..................... None
See application file for complete search history.

(56) References Cited

U.S. PATENT DOCUMENTS

| | | | |
|---|---|---|---|
| 5,131,013 A | 7/1992 | Choi | |
| 5,162,047 A | 11/1992 | Wada et al. | 29/25.01 |
| 5,334,257 A | 8/1994 | Nishi et al. | 118/500 |
| 5,343,476 A * | 8/1994 | Urbansky | 370/506 |
| 5,361,263 A * | 11/1994 | Urbansky | 370/505 |
| 5,426,672 A * | 6/1995 | Volejnik | 375/371 |
| 5,537,447 A * | 7/1996 | Urbansky | 375/372 |
| 5,563,891 A * | 10/1996 | Wang | 370/505 |
| 5,581,493 A * | 12/1996 | Etienne et al. | 708/300 |
| 5,604,773 A * | 2/1997 | Urala | 375/372 |
| 5,781,597 A | 7/1998 | Owen, III et al. | |
| 5,820,367 A | 10/1998 | Osawa | 432/253 |
| 6,062,853 A | 5/2000 | Shimazu et al. | 432/258 |
| 6,156,121 A | 12/2000 | Hasebe et al. | 118/500 |
| 6,188,685 B1 | 2/2001 | Wolf et al. | |
| 6,538,277 B2 | 3/2003 | Sung et al. | 257/317 |
| 6,577,693 B1 * | 6/2003 | Wolf | 375/372 |
| 6,885,681 B2 * | 4/2005 | Tanaka et al. | 370/503 |
| 6,982,995 B2 * | 1/2006 | Acimovic | 370/518 |

FOREIGN PATENT DOCUMENTS

| | | | |
|---|---|---|---|
| CA | 2271277 | * | 5/1999 |
| WO | WO 93/12600 A1 | | 6/1993 |

OTHER PUBLICATIONS

Klein et al, SONET/SDH Pointer Processor Implementation, IEEE, pp. 655-660, 1994.*
Autry et al, Minimization of the Accumulated Phase Change at the Input of SDH/SONET Desynchronizer, IEEE, pp. 315-320, 1996.*

(Continued)

*Primary Examiner*—Frank Duong
(74) *Attorney, Agent, or Firm*—Sughrue Mion, PLLC

(57) ABSTRACT

A desynchronizer for extracting and desynchronizing a tributary signal from a multiplex signal at its original data rate has a buffer memory for temporarily storing tributary data bits extracted from the multiplex signal, an adjustable oscillator for generating a read clock for reading the tributary data bits or bytes from the buffer, and a comparator for comparing the read and write timing rates of the buffer memory in synchronism with the frame rate of the multiplex signal to generate a control signal to adjust the oscillator.

6 Claims, 1 Drawing Sheet

OTHER PUBLICATIONS

Ruan A Q et al: "An Improved Desychronizer with Reduced Waiting Time Jitter for Digital TDM Systems" Proceedings of the Pacific Rim Conference on Communications, Computer and Signal Processing. Victoria, VA, May 9-10, 1991, New York, IEEE, US, vol. 1, May 9, 1991, pp. 297-300, XP000280309.

R. Urbansky: "Simulation Results and Field Trial Experience of Justification jitter", 6th World Telecommunication Forum part 2, Oct. 10-15, 1991, Technical Symposium, Integration Interconnection: The Way to Global Services Geneva, Switzerland, Int. Telecommun. Union, 1991, pp. 45-49, vol. 3 of 3.

* cited by examiner

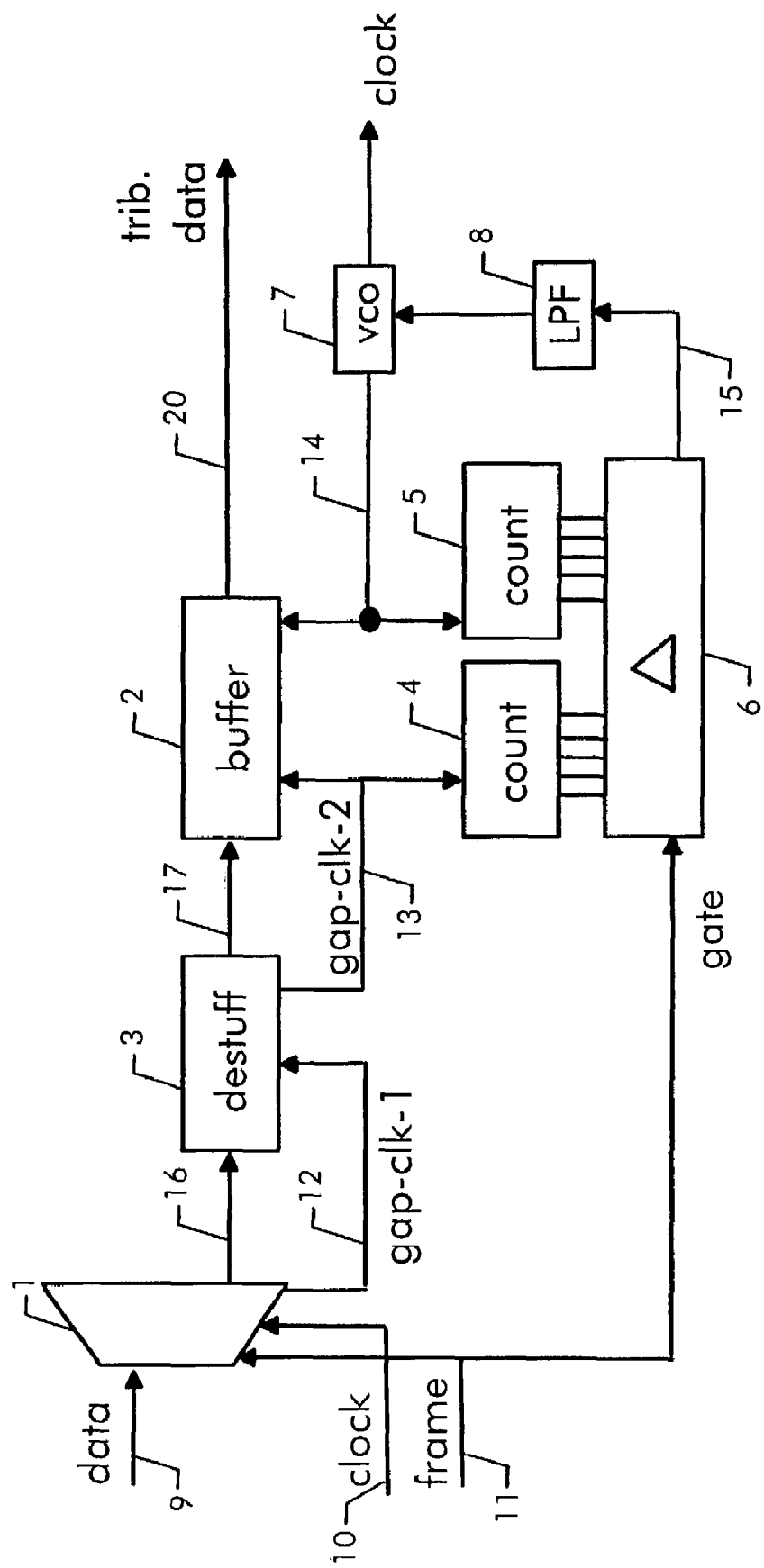

PLESIOCHRONOUS DEMULTIPLEXER

The invention is bases on a priority application EP 02 360 076.0 which is hereby incorporated by reference.

FIELD OF THE INVENTION

The invention relates to the field of telecommunications and more particularly to the transport of payload signals over a digital transmission system. In particular, the invention relates to a plesiochronous demultiplexer and corresponding method of demultiplexing a plesiochronous payload signal from a multiplex transmission signal.

BACKGROUND OF THE INVENTION

Today's transmission systems build basically on time division multiplexing. This is, a number of digital tributary signals are interleaved to form a multiplex transmission signal which is then transmitted over the transmission system. The tributary signals, however, do not necessarily derive their timing from the same reference timing source and may further be subject to varying delay. Therefore, in order to allow them to be interleaved, their bitrates need to be adjusted to a common rate. This is called synchronization. There are different techniques known for synchronization of which the most important one is bit or byte justification. Additional stuff bits or bytes are added to or omitted from the tributary signals if necessary to adapt their data rate.

One important transmission system is known as SDH (Synchronous Digital Hierarchy) which bases on a frame format and multiplexing hierarchy defined in ITU-T G.707 (2000). The basic transport frame in SDH is called STM-N (Synchronous Transport Module, N=1, 4, 16, 64, 256) and tributary signals are carried within this STM-N frame. In order to form the frame, tributary signals are first mapped into what is called a container (C-N, N=4, 3, 2, 12, or 11) by positive/zero/negative bit stuffing. This brings them up to a common rate. Together with some path overhead, they are called virtual containers VC-N. Lower order virtual containers (VC-3, 2, 12, 11) are multiplexed into a higher order virtual container (VC-4) which is then mapped into an STM-1 frame.

However, virtual containers coming from different places in a network may still have slightly different rates and phases. In order to compensate for this phase and frequency differences, pointers address the virtual containers inside their higher order structure. In particular a first pointer called AU pointer (AU: administrative unit) addresses the VC-4 inside the STM-1 and TU pointers (TU: tributary unit) address the lower order VCs inside the VC-4. Each pointer indicates in number of bytes the phase offset between the first possible byte position and the actual beginning of the VC. In order to compensate for frequency differences, stuff bytes (either three for the VC-4 or one for lower order VCs) may be inserted and the pointer is adjusted accordingly by +/−1.

This is called pointer justification event and is in principle the same as positive/zero/negative byte justification. Justification can happen on any level of VC.

Another recently developed transmission system is called OTN (Optical Transport Network) and is based on a frame structure and multiplexing hierarchy defined in ITU-T G.709 (2001). The multiplexing of tributary signals is likewise based on bit and byte justification.

However, at the far end of a transmission line or path, the tributary signal is to be extracted from the transport frame structure and the original data rate must be recovered. Recovery of the original data rate is a primary issue in any synchronous or plesiochronous transmission systems (as opposed to asynchronous or packet oriented transmission systems) since these types of transmission systems are required not to affect the data rate of a tributary signal.

Extraction and recovery of the tributary signal at its original data rate is basically performed by removing any stuff bits or bytes, writing the signal into a buffer memory and reading the tributary signal from the buffer at the rate of a local oscillator. In order to avoid over- or underflow of the buffer, the frequency of the local oscillator is controlled so as to run faster when the buffer is too full and conversely to run slower when the buffer is too empty. The device that performs this extraction and recovery is called a desynchronizer and the process is called desynchronization.

A basic desynchronizer which operates this way is known from R. Urbansky, "Simulation Results and Field Trial Experience of Justification Jitter", 6th World Telecommunication Forum part 2, 10-15 Oct. 1991, Technical Symposium, Integration Interoperation and Interconnection: The Way to Global Services, Geneva, Switzerland, Int. Telecommun. Union, 1991, p. 45-49, vol. 3 of 3, which is incorporated by reference herein.

However, justification events occurring in the multiplex signals will cause the local oscillator to retard or accelerate, which may cause high and low frequency phase variations, called jitter and wander, respectively, in the recovered tributary signal. Another particular source for low frequency jitter and wander is the oscillator control process as such, which is based on measuring the filling level of the buffer or equally comparing read and write timing phases. As the data bytes of the tributary signal are not equally distributed over the multiplex signal, gaps occur in the clock of the tributary data stream which are due to overhead or FEC (forward error correction) bytes, respectively blocked from entering the buffer. These gaps affect the comparison process between read and write timing rate of the buffer and thus produce low frequency jitter and wander. Jitter and wander, however, are impairments to the original tributary signal and therefore, these need to be avoided or reduced to an acceptable minimum.

There are a number of proposals of how to implement a desynchronizer which reduces jitter and wander produced in the recovered tributary signal.

U.S. Pat. No. 6,188,685 describes a method which first restructures the multiplex signal so as to spread the overhead section equally along the frame and then extracts and desynchronizes the tributary signals. This avoids large gaps in the payload clock of the multiplex signal and thus makes phase comparison, which is the basis for controlling the local oscillator, more accurate.

U.S. Pat. No. 5,781,597 describes a desynchronizer which counts and compares frame bytes rather than only payload bytes. Justification events which occur in the multiplex signal are taken into account by an additional correction parameter called leak factor. This avoids the gaps in the payload write clock affecting the oscillator control process.

WO 93/12600 describes a desynchonizer of the above-described type, where the local clock generator is tuned in synchronism with the multiframe rate of the virtual container that contains the tributary signal to be recovered. U.S. Pat. No. 5,131,013 described a similar approach where the local clock generator is tuned in synchronism with the frame clock of the virtual container that contains the tributary signal to be extracted.

However, the known desynchronization techniques are either unsatisfactory or complex. It is therefore an object of the present invention to provide another desynchronizer and corresponding method for desynchronization which produces reduced jitter and wander with low technical effort.

SUMMARY OF THE INVENTION

These and other objects that appear below are achieved by a method of extracting and desynchronizing a tributary signal from a multiplex signal by writing the tributary signal bits or bytes from the multiplex signal into a buffer and reading them out again at the timing rate of a local oscillator. The frequency of the oscillator is controlled to prevent buffer overflow or underflow by comparing the number of bits and bytes being read from the buffer or being written into the buffer in synchronism to the frame of the multiplex signal.

The desynchronizer according to the invention has a buffer memory for temporarily storing tributary data bits extracted from the multiplex signal, an adjustable oscillator for generating a read clock for reading the tributary data bits or bytes from the buffer, and a comparator for comparing the read and write timing rates of the buffer memory in synchronism with the frame rate of the multiplex signal to generate a control signal to adjust the oscillator.

The invention has the advantage that the jitter performance of the desynchronizer is independent of the multiplex structure of the multiplex signal and is therefore equally applicable to SDH, OTN, or other kind of synchronous or plesiochronous multiplex signals.

BRIEF DESCRIPTION OF THE DRAWINGS

A preferred embodiment of the present invention will now be described with reference to the accompanying drawing in which the sole FIGURE shows a block diagram of a desynchronizer according to the invention.

DETAILED DESCRIPTION OF THE INVENTION

A block diagram of the preferred embodiment of the present invention is provided in FIG. 1. It shows a demultiplexer 1 connected to a destuffing device 3. The destuff device 3 is connected to a buffer memory 2. A local oscillator 7 produces a read clock signal 14 for the buffer memory 2. First and second counters 4, 5 are connected to the read clock 14 and write clock 13 signals, respectively, and the output of the counters 4, 5 is fed to a comparator 6. The comparator 6 is connected via a low-pass filter 8 to the control lead of the oscillator 7.

The demultiplexer 1 receives a multiplex signal 9, a clock signal 10 and a frame clock signal 11, the latter two being both derived from the multiplex signal 9. The multiplexer 1 produces an extracted tributary signal 16 and a first gapped clock signal 12 which are fed to the destuff device 3. The first gapped clock signal 12 has clock pulses when data bits of the tributary signal 16 occur and gaps elsewhere. Gaps correspond to data bits of other tributary signals as well as to overhead or FEC bits in the multiplex signal 9.

The destuff device 3 removes any justification bits or bytes from the tributary signal 16 and produces a second gapped clock signal 13 which has additional gaps for the removed justification bits. The extracted and destuffed tributary signal 17 is then written into the buffer memory 2 using the second gapped clock signal 13 as write clock. The tributary data bits are then read from the buffer using the clock signal 14 from local oscillator 7 as read clock signal. This produces the recovered tributary signal 20 which is output of the desynchronizer.

A first counter 4 counts the write clock 13 and a second counter 5 counts the read clock 14. The count values are supplied to the comparator 6, which produces the control signal 15. Control signal 15 is then low-pass filtered by filter 8 to reduce high frequency jitter components and then fed to the local oscillator 7 to adjust the frequency of its read clock signal 14. Read clock signal 14 is also output of the desynchronizer as clock signal accompanying the recovered tributary signal 20.

According to the invention, frame clock signal 4 is also fed to comparator 6 and used as gate signal for the comparison. This means, the comparison takes place only at a single location within each frame (e.g. its beginning) of the multiplex signal 9 and thus in synchronism with the frame clock 4. In other words, the frame clock signal 11 triggers the comparator 6 to perform a comparison. This prevents systematic variations of the buffer fill due the gaps in the write clock signal from affecting the comparison process, which otherwise could be transformed into low frequency jitter or wander in the recovered tributary signal. The read clock signal is thus a smoothed clock signal at the average rate of the gapped write clock signal.

Having now described an embodiment of the invention in detail, several modifications of the invention are possible. Such modifications include for example the following:

The comparison of read and write timing rates 14, 13 can equally be performed by determining the buffer fill. A control signal 15 can also be generated only if the result of the comparison exceeds or falls below an upper or lower threshold, respectively. The destuff device 3 can be part of the demultiplexer 1. Instead of comparing the read and write timing rates in synchronism with the frame rate, the adjustment of the oscillator can be performed in synchronism with the frame rate, which would be equivalent as it produces the same result. The counters 4 and 5 can also act as read and write address counters, respectively or can be part of comparator 6. The oscillator 7 can be any kind of clock generator, including for example a voltage controlled or numeric controlled oscillator with or without inner phase locked loop control (PLL) and an variable divider supplied by an external reference clock adapted to derive a read clock signal by dividing the external reference by either N−1, N, or N+1. Read and write process can both be bit or byte based or based on any other size of data entities (e.g., half bytes, also called nibbles). Read and write clocks can conversely be either bit or byte clocks or clocks of any other size of data entities. The comparison can take place at any instant in time relative to the frame clock, provided that this instant is substantially invariant with respect to the write clock and thus is synchronism. Comparison can take place once or several times per frame, provided that comparison is still in synchronism with the frame clock. Low-pass filter 8 is optional. Extracted tributary signal 17 can also be the entire multiplex signal since other than the bytes of interest of the tributary signal are blocked from entering the buffer by the gapped clock signal 13, anyway. These and other modifications will be apparent to those skilled in the art having read the above description and understood the principles of the invention.

What is claimed is:

1. A desynchronizer for recovering a tributary signal extracted from a multiplex signal at substantially its original data rate, said desynchronizer comprising:
   a buffer for temporarily storing tributary data of said tributary signal extracted from said multiplex signal,
   an adjustable clock generator for generating a read clock for reading said tributary data from the buffer, and
   a comparator for comparing read and write timing rates of said buffer to generate a control signal to adjust said clock generator, wherein said comparator either performs comparison of read and write timing rates in synchronism with a frame rate of said multiplex signal or performs adjustment of said clock generator in synchronism with the frame rate of said multiplex signal.

2. A desynchronizer according to claim 1, further comprising a low-pass filter for filtering said control signal.

3. A desynchronizer according to claim 1, further comprising read and write clock counters for counting said read and write timing rates.

4. A desynchronizer according to claim 3, wherein said read and write clock counters serve as read and write address generators for said buffer.

5. A desynchronizer according to claim 1, wherein said write timing rate is a gapped clock signal having clock pulses only when valid tributary data occur in the multiplex signal.

6. A method of recovering a tributary signal extracted from a multiplex signal at its original data rate, said method comprising the steps of:
   temporarily storing tributary data of said tributary signal extracted from said multiplex signal in a buffer,
   generating a read clock for reading said tributary data from the buffer,
   comparing read and write timing rates of said buffer in synchronism with a frame rate of said multiplex signal to generate a control signal, and
   adjusting the frequency of said read clock using said control signal, wherein either comparing of read and write timing rates is performed in synchronism with a frame rate of said multiplex signal or adjustment of said clock generator is performed in synchronism with the frame rate of said multiplex signal.

* * * * *